(12) United States Patent
Omura (10) Patent No.: US 10,094,301 B2
(45) Date of Patent: Oct. 9, 2018

(54) INTERNAL COMBUSTION ENGINE CONTROLLER

(71) Applicant: TOYOTA JIDOSHA KABUSHIKI KAISHA, Toyota-shi, Aichi-ken (JP)

(72) Inventor: Tetsuo Omura, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 237 days.

(21) Appl. No.: 14/785,079

(22) PCT Filed: May 15, 2014

(86) PCT No.: PCT/JP2014/062958
§ 371 (c)(1),
(2) Date: Oct. 16, 2015

(87) PCT Pub. No.: WO2014/185493
PCT Pub. Date: Nov. 20, 2014

(65) Prior Publication Data
US 2016/0084171 A1 Mar. 24, 2016

(30) Foreign Application Priority Data
May 16, 2013 (JP) .................. 2013-104359

(51) Int. Cl.
*F02D 13/02* (2006.01)
*F02D 41/14* (2006.01)
(Continued)

(52) U.S. Cl.
CPC ........... *F02D 13/0215* (2013.01); *F02D 9/04* (2013.01); *F02D 13/0203* (2013.01);
(Continued)

(58) Field of Classification Search
CPC .... F02D 13/0215; F02D 9/04; F02D 13/0203; F02D 41/0002; F02D 41/1448;
(Continued)

(56) References Cited

U.S. PATENT DOCUMENTS 5,918,582 A * 7/1999 Itoyama .............. F02D 41/0007
123/480
7,051,689 B2 * 5/2006 Tamura ................ F01N 3/2006
123/90.15
(Continued)

FOREIGN PATENT DOCUMENTS

CN 101883919 A 11/2010
JP 2004-332561 A 11/2004
(Continued)

*Primary Examiner* — Stephen K Cronin
*Assistant Examiner* — Susan Scharpf
(74) *Attorney, Agent, or Firm* — Hauptman Ham, LLP (57) ABSTRACT

A controller is applied to such an internal combustion engine that an exhaust throttle valve for controlling the flow volume of exhaust gas of the exhaust passage is provided in the exhaust passage, an intake variable valve mechanism for changing the timing of opening and closing each intake valve or an exhaust variable valve mechanism for changing the timing of opening and closing each exhaust valve is provided, and an overlap period when an opening period of the intake valve and an opening period of the exhaust valve overlap with each other can be provided, and controls the exhaust throttle valve so that an opening degree of the exhaust throttle valve in the overlap period is made smaller than an opening degree of the exhaust throttle valve in a case where the overlap period is not provided.

2 Claims, 8 Drawing Sheets

(51) Int. Cl.
    *F02D 41/00*     (2006.01)
    *F02D 9/04*     (2006.01)
    *F02D 41/18*     (2006.01)
    *F02D 21/08*     (2006.01)

(52) U.S. Cl.
    CPC ..... *F02D 41/0002* (2013.01); *F02D 41/1448* (2013.01); *F02D 41/18* (2013.01); *F02D 2021/083* (2013.01); *F02D 2041/001* (2013.01); *F02D 2041/002* (2013.01); *F02D 2200/0406* (2013.01); *Y02T 10/18* (2013.01); *Y02T 10/42* (2013.01)

(58) Field of Classification Search
    CPC ............... F02D 41/18; F02D 2021/083; F02D 2041/001; F02D 2041/002; F02D 2200/0406; Y02T 10/18; Y02T 10/42
    USPC ....................................................... 123/323
    See application file for complete search history.

(56) References Cited

U.S. PATENT DOCUMENTS

| | | | | |
|---|---|---|---|---|
| 8,020,525 | B2* | 9/2011 | Winstead | F02D 13/0207 |
| | | | | 123/568.11 |
| 8,205,583 | B2* | 6/2012 | Winstead | F02D 13/0207 |
| | | | | 123/568.11 |
| 8,347,613 | B2* | 1/2013 | Van Nieuwstadt | F01N 3/0238 |
| | | | | 60/278 |
| 9,334,783 | B2* | 5/2016 | Pursifull | F01N 5/02 |
| 9,404,409 | B2* | 8/2016 | Pursifull | F01N 5/02 |
| 9,429,110 | B2* | 8/2016 | Ulrey | F02M 26/05 |
| 9,556,771 | B2* | 1/2017 | Ulrey | F01N 3/10 |
| 9,636,973 | B2* | 5/2017 | Pursifull | F01N 5/02 |
| 2009/0094978 | A1* | 4/2009 | Yamagata | F01N 13/107 |
| | | | | 60/602 |
| 2011/0054760 | A1 | 3/2011 | Ogawa et al. | |
| 2012/0167858 | A1* | 7/2012 | Kakuda | F02D 41/0072 |
| | | | | 123/27 R |
| 2015/0017070 | A1* | 1/2015 | Yamane | F02D 41/405 |
| | | | | 422/119 |
| 2016/0146137 | A1* | 5/2016 | Hagari | F02D 41/0072 |
| | | | | 123/350 |

FOREIGN PATENT DOCUMENTS

| | | |
|---|---|---|
| JP | 2009-091917 A | 4/2009 |
| JP | 2009-097335 A | 5/2009 |
| JP | 2009-180204 A | 8/2009 |

* cited by examiner

INTERNAL COMBUSTION ENGINE CONTROLLER

CROSS-REFERENCE TO RELATED APPLICATIONS

This is a national phase application based on the PCT International Patent Application No. PCT/JP2014/062958 filed May 15, 2014, claiming priority to Japanese Patent Application No. 2013-104359 filed May 16, 2013, the entire contents of both of which are incorporated herein by reference.

TECHNICAL FIELD

The present invention relates to a controller applied to an internal combustion engine which comprises an exhaust throttle valve of an exhaust passage.

BACKGROUND ART

There is known an internal combustion engine controller which is capable of expanding the amplitude of pulsation of exhaust manifold pressure by closing an EGR valve provided to an EGR passage to reduce a volume of space connecting to the exhaust manifold, and thereby, capable of decreasing the exhaust manifold pressure during an overlap period when an intake valve opening period and an exhaust valve closing period overlap with each other for each cylinder (see the Patent Literature 1). Additionally, the Patent Literature 2 is also a background art document relating to the present invention.

CITATION LIST

Patent Literature

PTL1: JP-A-2009-091917
PTL2: JP-A-2009-180204

SUMMARY OF INVENTION

Technical Problem

When intake pressure becomes higher than exhaust pressure during the overlap period in the internal combustion engine, intake gas passes by a cylinder. Then, hyperoxia and increase in temperature make a catalyst deteriorate, and purification efficiency of the catalyst decreases. In order to suppress the deterioration of the catalyst, if the overlap period is shorten or eliminated by making the closing timing of the exhaust valve earlier or making the opening timing of the intake valve later, charging efficiency of the intake gas decreases. Therefore, performance of the internal combustion engine under a high load decreases.

Then, the present invention aims to provide an internal combustion engine controller which can suppress the deterioration of a catalyst while suppressing the decrease of performance of the internal combustion engine under a high load.

Solution to Problem

An international combustion engine controller as one aspect of the present invention is an internal combustion engine controller being applied to an internal combustion engine where an exhaust throttle valve allowed to control flow volume of exhaust gas in an exhaust passage is provided in the exhaust passage, at least one of an intake variable valve mechanism allowed to change a timing of opening and closing each intake valve and an exhaust variable valve mechanism allowed to change a timing of opening and closing each exhaust valve is provided, and an overlap period when an opening period of the intake valve and an opening period of the exhaust valve overlap with each other is allowed to be provided, the internal combustion engine controller comprising a valve controlling device which is configured to control the exhaust throttle valve, wherein the valve controlling device is configured to control the exhaust throttle valve so that an opening degree of the exhaust throttle valve in the overlap period is made smaller than an opening degree of the exhaust throttle valve in a case where the overlap period is not provided.

According to the internal combustion engine controller of the present invention, since the opening degree of the exhaust throttle valve in the overlap period is smaller than the opening degree of a case where the overlap period is not provided, the exhaust pressure in the overlap period is made higher than the exhaust pressure of a case where the overlap period is not provided. Thereby, since it is possible to reduce or eliminate the passing-by of intake gas, it is possible to suppress the deterioration of a catalyst.

In one embodiment of the internal combustion engine controller of the present invention, the internal combustion engine controller may further comprise: an intake pressure detecting device which detects intake pressure in an intake passage; and an exhaust pressure detecting device which detects exhaust pressure of a portion on an upstream side further than the exhaust throttle valve in the exhaust passage, wherein the valve controlling device may be configured to control the exhaust throttle valve in a closing direction, when the exhaust pressure is equal to or less than the intake pressure in the overlap period.

According to this embodiment, in a case that the exhaust pressure is equal to or less than the intake pressure in the overlap period, the exhaust throttle valve is controlled in the closing direction by the valve controlling device. Thereby, it is possible to reduce the difference between the exhaust pressure and the intake pressure in the overlap period, or possible to make the exhaust pressure higher than the intake pressure. Due to this, since it is possible to reduce or eliminate the passing-by of intake gas, it is possible to suppress the deterioration of the catalyst.

In another embodiment of the internal combustion engine controller of the present invention, the internal combustion engine controller may further comprise: an intake pressure detecting device which detects intake pressure in an intake passage; and an exhaust pressure detecting device which detects exhaust pressure of a portion on an upstream side further than the exhaust throttle valve in the exhaust passage, wherein the valve controlling device may be configured to control the exhaust throttle valve so that the exhaust pressure is made higher than the intake pressure in the overlap period.

According to this embodiment, since the exhaust pressure is made higher than the intake pressure in the overlap period, the passing-by of intake gas does not occur. Thereby, it is possible to suppress the deterioration of the catalyst.

DESCRIPTION OF EMBODIMENTS

First Embodiment

Figure 1:
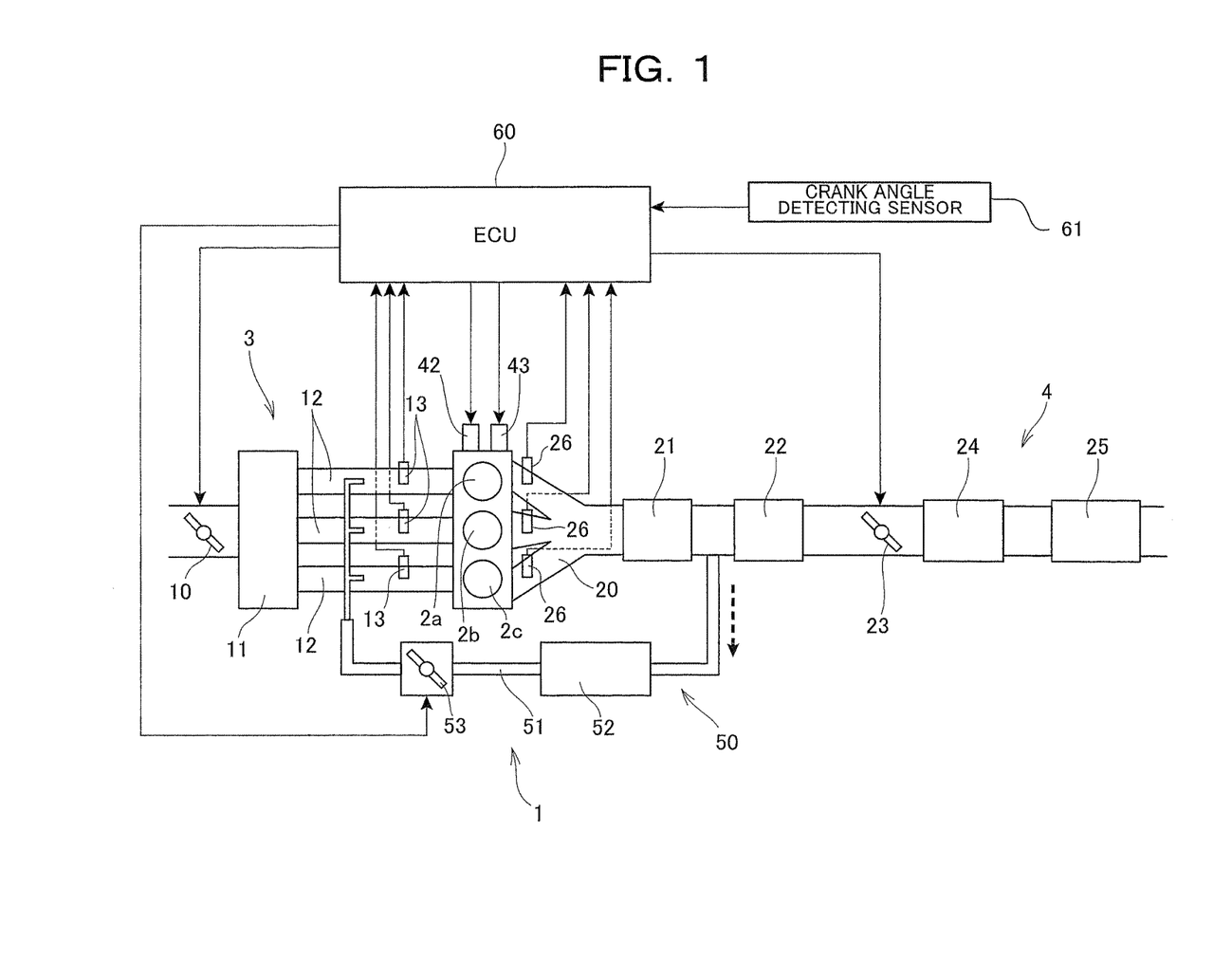
FIG. 1 is a diagram showing an internal combustion engine controller according to one embodiment of the present invention.

An internal combustion engine 1 shown in FIG. 1 is installed in a vehicle, not illustrated, as a power source for travel. The internal combustion engine 1 is configured as an in-line three cylinder type spark-ignited internal combustion engine where a first cylinder 2a, a second cylinder 2b and a third cylinder 2c are arranged in one direction. The ignition order of the internal combustion engine 1 is set in this order: the cylinder 2a the cylinder 2b→the cylinder 2c. Hereinafter, when it is unnecessary to discriminate the cylinders 2a, 2b, 2c from each other, each cylinder is referred to as the cylinder 2. To each cylinder 2, an intake passage 3 and an exhaust passage 4 are connected to.

The intake passage 3 comprises a throttle valve 10, a surge tank 11 and a branch conduit 12. One branch conduit 12 is provided for each cylinder 2, so that three branch conduits 12 are provided in total. To each of the three branch conduits 12, one intake pressure detecting sensor 13 is provided as an intake pressure detecting device. In the internal combustion engine 1, the intake gas flows through the throttle valve 10 and the surge tank 11, and at the branch conduits 12, the intake gas is divided for each cylinder 2 to be charged in the cylinder 2. The flow volume of the intake gas flowing in the intake passage 3 is possible to be controlled with the throttle valve 10.

The exhaust passage 4 comprises an exhaust manifold 20, a first catalyst 21, a second catalyst 22, an exhaust throttle valve 23, a sub muffler 24, and a main muffler 25. One exhaust pressure detecting sensor 26 is provided as an exhaust pressure detecting device to each of three branched portions of the exhaust manifold 20, the three branched portions corresponding to the cylinders 2 respectively. Exhaust gas discharged from each cylinder 2 is collected in the exhaust manifold 20, and then, after harmful substances being purified by the catalyst 21 and the catalyst 22, the collected exhaust gas flows through the exhaust throttle valve 23, the sub muffler 24 and the main muffler 25 to be discharged to the atmosphere. The exhaust throttle valve 23 is capable of controlling the flow volume of the exhaust gas flowing in the exhaust passage 4.

Figure 2:
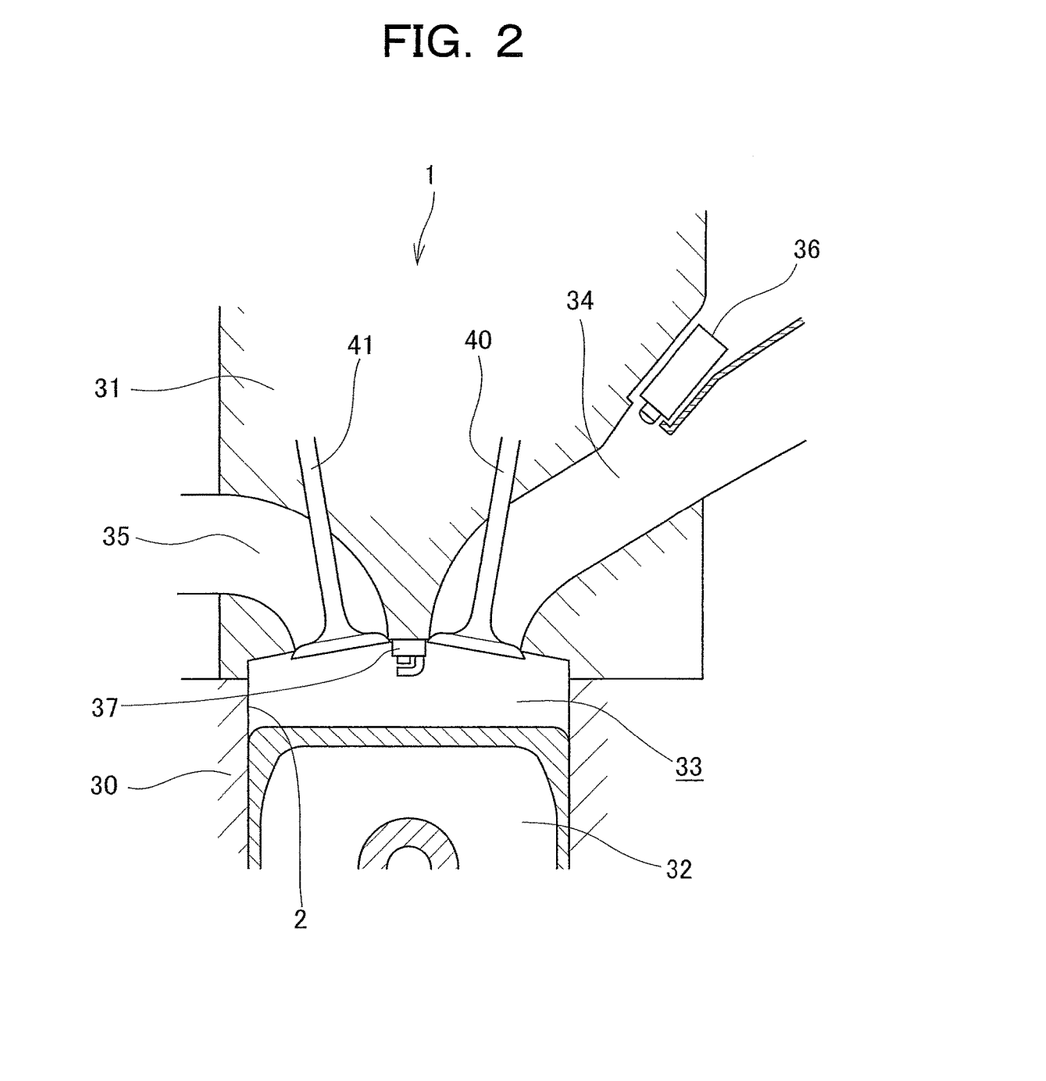
FIG. 2 is a cross-section diagram obtaining by cutting an internal combustion engine, which the controller according to one embodiment of the present invention is applied to, at a plane extending along a center line of a cylinder of the internal combustion engine.

As shown in FIG. 2, the internal combustion engine 1 comprises a cylinder block 30 where each cylinder 2 is formed and a cylinder head 31 which closes an opening portion of each cylinder 2. With respect to each of the cylinders 2, by inserting a piston 32 to the cylinder 2, a combustion chamber 33 is formed between the piston 32 and the cylinder head 31. For each cylinder 2, an intake port 34 and an exhaust port 35 opening toward the combustion chamber 33 are formed in the cylinder head 31. The intake port 34 composes one portion of the intake passage 3, and the exhaust port 35 composes one portion of the exhaust passage 4. The cylinder head 31 is provided with a fuel injection valve 36 for injecting fuel into the intake port 34, and a spark plug 37 for igniting mixture gas containing fuel and intake gas in the combustion chamber 33. The intake port 34 is provided with an intake valve 40, and the exhaust port 35 is provided with an exhaust valve 41.

As shown in FIG. 1, the internal combustion engine 1 comprises: an intake variable valve mechanism 42 which is allowed to change the timings of opening and closing the intake valve 40; and an exhaust variable valve mechanism 43 which is allowed to change the timings of opening and closing the exhaust valve 41. The intake variable valve mechanism 42 and the exhaust variable valve mechanism 43 are well known mechanisms which are configured to vary succeedingly phases of cams for driving the intake valve 40 and the exhaust valve 41 respectively. Instead of the mechanisms 42 and 43, other mechanisms having different configurations may be employed. With the intake variable valve mechanism 42 and the exhaust variable valve mechanism 43, it is possible to change the duration of an overlap period when a valve opening period of the intake valve 40 and a valve opening period of the exhaust valve 41 overlap with each other.

The internal combustion engine 1 is provided with an EGR device 50 for recirculating exhaust gas to an intake system. The EGR device 50 comprises: an EGR passage 51 for taking out one part of exhaust gas as EGR gas from a portion between the catalysts 21 and 22 in the exhaust passage 4 and leading the EGR gas to each branch conduit 12; an EGR cooler 52 for cooling the EGR gas led into the EGR passage 51; and an EGR valve 53 for controlling the flow volume of the EGR gas flowing in the EGR passage 41.

Each portion of the internal combustion engine 1 is controlled by an engine control unit (ECU) 60 which is configured as a computer. The ECU 60 includes a micro processor and peripheral devices necessary for operations of the micro processor such as a RAM and a ROM. The ECU 60 executes various kinds of control to the exhaust throttle valve 23, the intake variable valve mechanism 42, the exhaust variable valve mechanism 43, and so on. An output signal from the intake pressure detecting sensor 13, an output signal from the exhaust pressure detecting sensor 26, and an output signal from a crank angle detecting sensor 61 are inputted to the ECU 60. By the output from the crank angle detecting sensor 61, it is possible to detect a rotational position of a crank shaft, and an engine rotational speed (the number of engine rotations).

Figure 3:
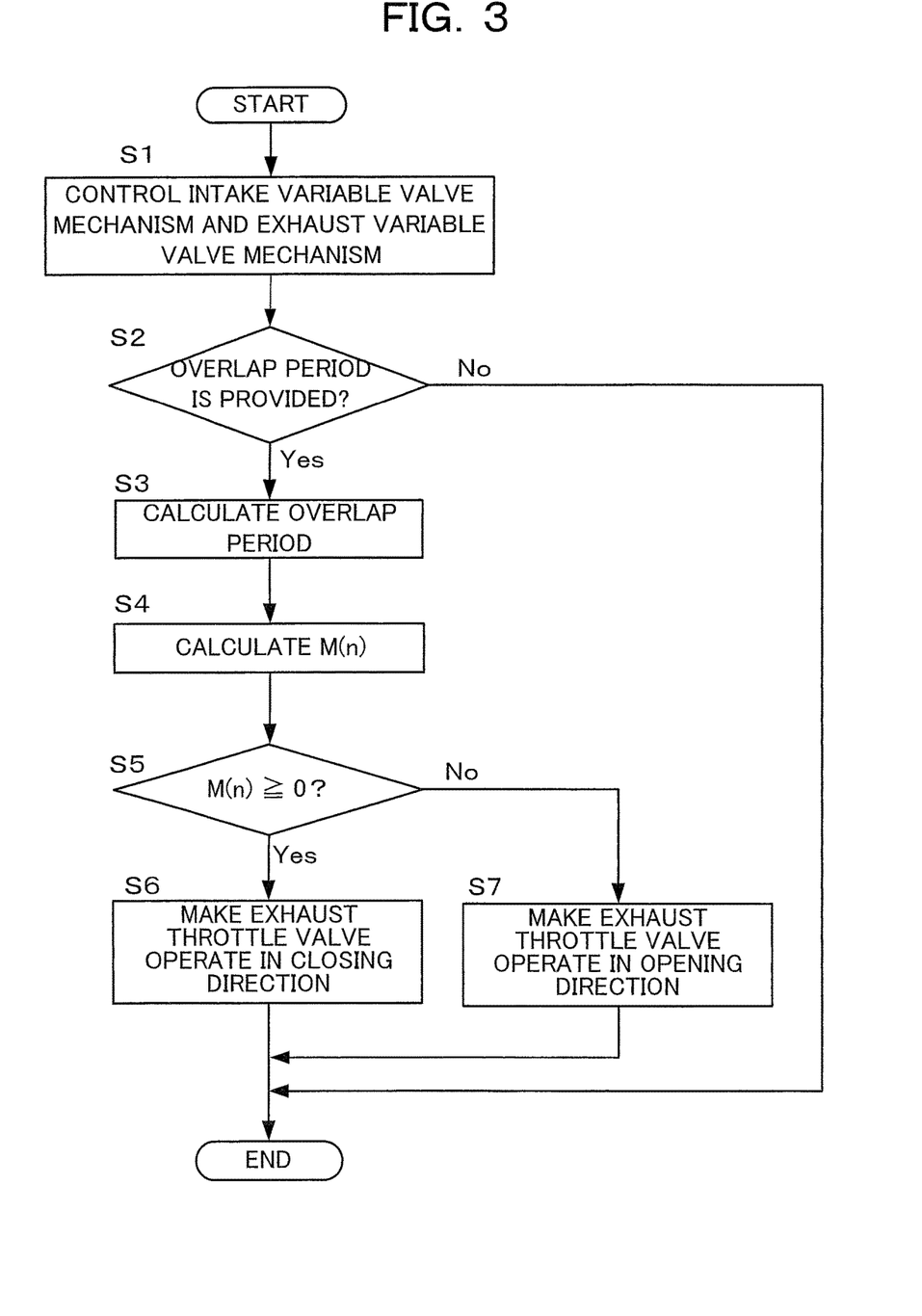
FIG. 3 is a flowchart showing one example of a control routine to be executed by the ECU.

FIG. 3 is a flowchart showing one example of a control routine which is executed by the ECU 60. A computer program for the control routine of FIG. 3 is held by the ECU 60, and read out as necessary to be executed repeatedly at predetermined intervals. The ECU 60 functions as a valve controlling device of the present invention by executing the control routine of FIG. 3.

In this control routine, the ECU 60 first, in step S1, executes control to change open-close timings of the intake valve 40 and the exhaust valve 41 by making each of the intake variable valve mechanism 42 and the exhaust variable valve mechanism 43 advance or retard according to the engine rotational speed and the like, the engine rotational speed being detected from the crank angle detecting sensor 61.

In the next step S2, the ECU 60 determines whether there is the overlap period when the valve opening period of the intake valve 40 and the valve opening period of the exhaust valve 41 overlap with each other. The valve opening period of the intake valve 40 can be calculated by a criterion valve opening period stored in the ROM or the like and an advanced amount or a retarded amount of the intake variable valve mechanism 42 obtained by the controlled in step S1. In a similar way, the valve opening period of the exhaust valve 41 can be calculated by a criterion valve opening period stored in the ROM or the like and an advanced amount or a retarded amount of the exhaust variable valve mechanism 43 obtained by the control in step S1. Based on the valve opening period of the intake valve 40 and the valve opening period of the exhaust valve 41 which have been calculated by the above ways, the ECU 60 determines whether or not there is the overlap period. When there is no overlap period, the ECU 60 ends the control routine of this time without operating the exhaust throttle valve. On the other hand, when there is the overlap period, the ECU 60 goes to step S3. In step S3, the ECU 60 calculates the overlap period. The ECU 60 calculates the overlap period using the valve opening period of the intake valve 40 and the valve opening period of the exhaust valve 41 which have been calculated by the above ways.

In the next step S4, the ECU 60 calculates the maximum value M(n) of a difference between an intake pressure Pin and an exhaust pressure Pex in the overlap period of a cylinder 2 which is n-th ignited. The ECU 60 calculates the difference between the intake pressure Pin and the exhaust pressure Pex while continuing to detect the input pressure Pin and the exhaust pressure Pex during the overlap period of the cylinder 2. Then, the ECU 60 calculates, as the M(n), the maximum value of the difference in the overlap period of the cylinder 2 n-th ignited. The maximum value M(n) is determined by the following formula 1.

$$M(n) = ((Pin - Pex)\max)n \qquad 1$$

The intake pressure Pin can be detected by the intake pressure detecting sensors 13 each being provided to the branch conduit 12 connecting to each cylinder 2. The exhaust pressure Pex can be detected by the exhaust pressure detecting sensors 26 each being arranged on a portion connecting to the cylinder 2 within a part of the exhaust manifold 20 branching off for each cylinder 2. The ECU 60 calculates the maximum value M(n) by using the intake pressures Pin detected and the exhaust pressures Pex detected.

In the next step S5, the ECU 60 determines whether to make the exhaust throttle valve 23 operate in a closing direction or not. Concretely, it is determined whether the maximum value M(n) is equal to or more than zero. When the maximum value M(n) is equal to or more than zero, that is, in a case of M(n)≥0, this indicates that the intake pressure Pin is equal to or more than the exhaust pressure Pex. When the maximum value M(n) is equal to or more than zero, the ECU goes to step S6 to make the exhaust throttle valve 23 operate in the closing direction. After that, the ECU 60 ends the control routine of this time. On the other hand, when the maximum value M(n) is less than zero, the ECU 60 goes to step S7 to make the exhaust throttle valve 23 operate in an opening direction. After that, the ECU 60 ends the control routine of this time.

Under a situation where the control routine of FIG. 3 is executed by the ECU 60, if a state where the exhaust pressure becomes equal to or less than the intake pressure occurs in the overlap period, the exhaust throttle valve 23 is controlled in the closing direction. By this control, it is possible to reduce a difference between the exhaust pressure and the intake pressure in the overlap period, or to make the exhaust pressure higher than the intake pressure. Thereby, since it is possible to reduce or eliminate the blow-by of the intake gas, it is possible to suppress the deterioration of the catalysts.

Second Embodiment

Next, a second embodiment of the present invention will be explained. The present embodiment has the same constructions as the first embodiment except that the present embodiment is different from the first embodiment in the method to control the exhaust throttle valve 23 by the ECU 60. Hereinafter, features of the second embodiment will be explained, and with respect to shared portions with the first embodiment, the same symbols as the first embodiment are assigned to the portions respectively, and explanations thereof are omitted.

Figure 4:
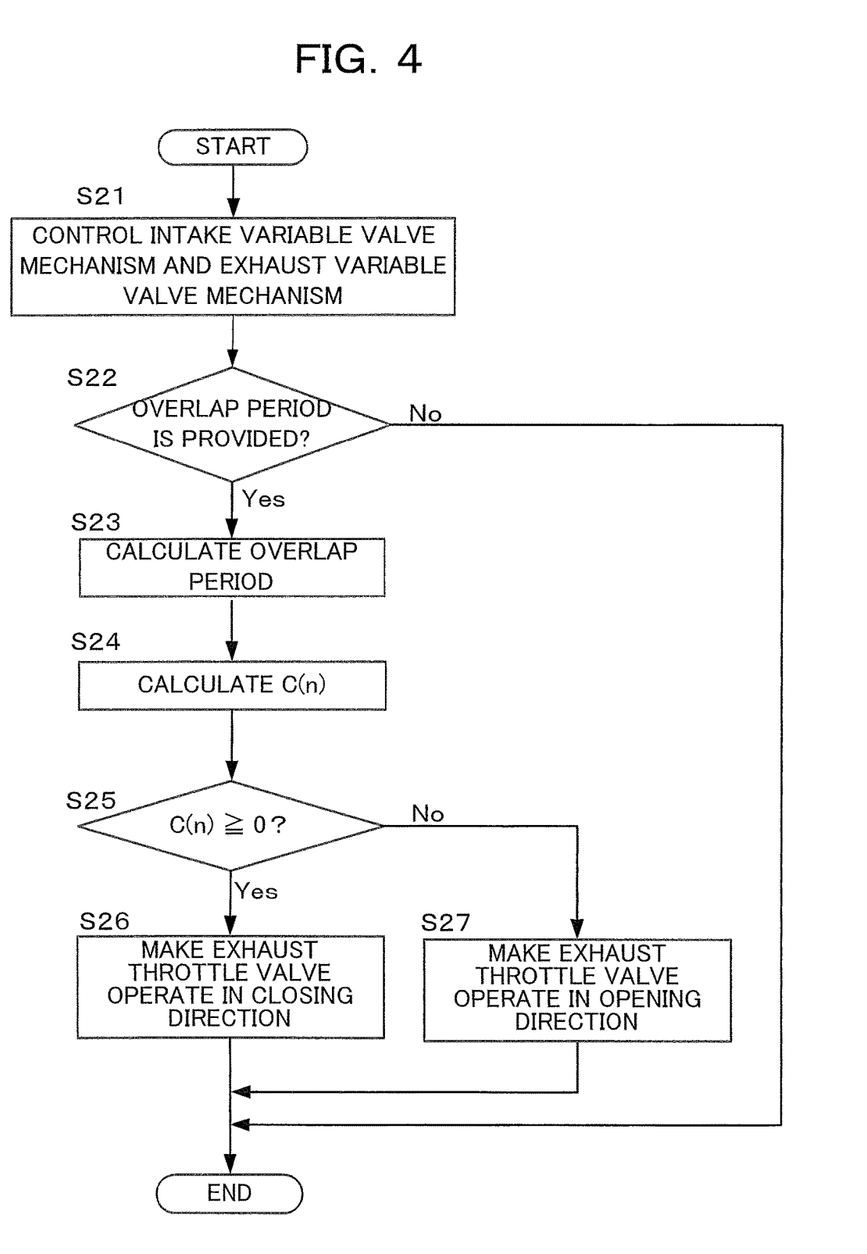
FIG. 4 is a flowchart showing a control routine to be executed by the ECU in a second embodiment.

FIG. 4 is a flowchart showing another example of a control routine to be executed by the ECU 60. A computer program of the control routine of FIG. 4 is held by the ECU 60, and is read as necessary to be executed repeatedly at predetermined intervals. The ECU 60 functions as a valve controlling device of the present invention by executing the control routine of FIG. 4.

In this control routine, as with step S1 of FIG. 3, in step S21 the ECU 60 first executes control to change the open-close timings of the intake valve 40 and the exhaust valve 41 by making each of the intake variable valve mechanism 42 and the exhaust variable valve mechanism 43 advance or retard according to the engine rotational speed and the like, the engine rotational speed being detected from the crank angle detecting sensor 61.

In the next step S22, as with step S2 of FIG. 3, the ECU 60 determines whether or not there is the overlap period. When there is no overlap period, the ECU 60 ends the control routine of this time without making the exhaust throttle valve operate. On the other hand, when there is the overlap period, the ECU 60 goes to step S23. In step S23, the ECU 60, as with step S3 of FIG. 3, calculates the overlap period when the valve opening period of the intake valve 40 and the valve opening period of the exhaust valve 41 overlap with each other.

In the next step S24, the ECU 60 calculates a determination criterion C(n) which is used for determining whether to control the exhaust throttle valve 23 in the closing direction. In order to calculate the determination criterion C(n), the ECU 60 calculates the maximum value M(n) and a changed amount ΔM(n). As with step S3 of FIG. 3, The ECU 60 calculates the maximum value M(n) of the difference between the intake pressure Pin and the exhaust pressure Pex in the overlap period of the cylinder 2 n-th ignited. And then, the ECU 60 calculates the changed amount ΔM(n) of the maximum value M(n). The changed amount ΔM(n) is a difference between the maximum value M(n) and the maximum value M(n−1). The maximum value M(n) is a maximum value of a difference between the intake pressure Pin and the exhaust pressure Pex in the overlap period of the cylinder 2 n-th ignited, and the maximum value M(n−1) is a maximum value of a difference between the intake pressure Pin and the exhaust pressure Pex in the overlap period of the cylinder 2 (n−1)-th ignited, which was ignited prior to n-th by one. The changed amount ΔM(n) is determined as the following formula 2.

$$\Delta M(n) = M(n) - M(n-1) \qquad 2$$

And then, the ECU 60 calculates the determination criterion C(n). The determination criterion C(n) is obtained by summing the maximum value M(n) and the changed amount ΔM(n). The determination criterion C(n) is determined as the following formula 3.

$$C(n) = M(n) + \Delta M(n) \qquad 3$$

In this way, the determination criterion C(n) is an estimated value as the maximum value M(n+1) of the cylinder 2 (n+1)-th ignited ted, which is estimated using the values of the intake pressure Pin and the exhaust pressure Pex of the cylinder n-th ignited and the cylinder (n−1)-th ignited. That is, even if the maximum value M(n) corresponding to the cylinder 2 n-th ignited is less than zero, if the determination criterion C(n) is equal to or more than zero, it is estimated that the maximum value M(n+1) of the cylinder 2 to be (n+1)-th ignited will become equal to or more than zero. Therefore, as mentioned later, by using the determination criterion C(n), it is possible to start to make the exhaust throttle valve 23 start in the closing direction before the intake pressure Pin becomes higher than the exhaust pressure Pex in the overlap period.

In the next step S25, the ECU 60 determines whether to make the exhaust throttle valve 23 operate in the closing direction. Concretely, the ECU 60 determines whether the determination criterion C(n) is equal to or more than zero. When the determination criterion C(n) is equal to or more than zero, that is, in a case of C(n)≥0, the ECU 60 goes to step S26 to make the exhaust throttle valve 23 operate in the closing direction. And, the ECU 60 ends the control routine of this time. On the other hand, when the determination criterion C(n) is less than zero, the ECU 60 goes to step S27 to make the exhaust throttle valve 23 operate in the opening direction. And the ECU 60 ends the control routine of this time.

Figure 5:
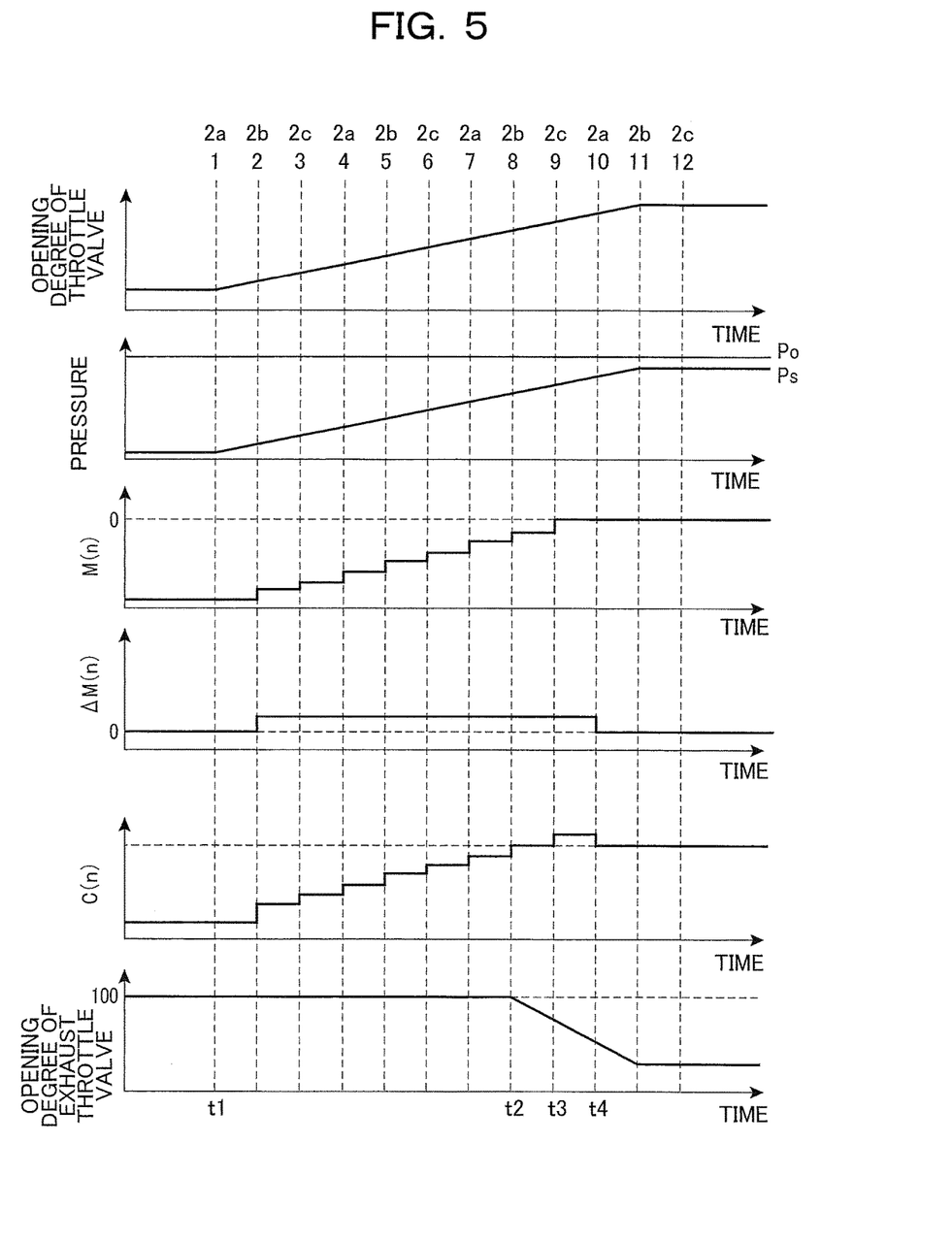
FIG. 5 is a timing chart showing one example of an operation of an exhaust throttle valve in the second embodiment.

FIG. 5 is a timing chart showing how the maximum vale M(n) and the like change in a period from the throttle valve 10 operate in the opening direction until the throttle valve 10 stops the operation, and how the exhaust throttle valve 23 operates according the change. In FIG. 5, at the highest portion, the cylinders 2a to 2c are shown, and each numeral shown just under each of the cylinders 2a to 2c indicates the order that the corresponding cylinder 2 is ignited. For example, "1" shown just under the cylinder 2a indicates that the cylinder 2a is first ignited. In FIG. 5, the cylinder 2a which is ignited just before the throttle valve 10 starts to operate in the opening direction is set as the cylinder 2a which is first ignited. The second ignited one is the cylinder 2b, and the third ignited one is the cylinder 2c. Also with respect to the fourth one and later, in the same way, the cylinder 2a, the cylinder 2b, and the cylinder 2c are ignited in this order. In FIG. 5, each dotted line extending a vertical direction indicates the time point when the exhaust valve 41 closes to end the overlap period following end of the exhaust stroke after ignition of cylinder 2. For example, the dotted line extending in the vertical direction under the numeral "1" in FIG. 5 indicates the time point when the exhaust valve 41 closes to end the overlap period following end of the exhaust stroke after the first ignition of cylinder 2a. The M(n) is updated at the moment when the overlap time ends, and does not change until the M(n) is updated at the moment when the overlap period of the next cylinder 2 ends. Thereby, the graph of the M(n) ascends or descends in a stepwise manner. As shown in FIG. 5, while the opening degree of the throttle valve 10 opens gradually from the time 1 when the overlap period of the cylinder 2b first ignited ends, pressure Ps of the inside of the surge tank 11 closes to the atmospheric pressure Po. Along with this, each time when the overlap period of the cylinder 2 ends, the M(n) is updated and ascends.

Along with the ascent of the M(n), the C(n) also ascends. In a case of FIG. 5, the state C(n)<0 is kept until the cylinder $2a$ $7^{th}$ ignited, and the C(n) corresponding to the cylinder $2b$ $8^{th}$ ignited turns to C(8)≥0. Accordingly, the exhaust throttle valve 23 is fully opened until the time t2 when the overlap period of the cylinder $2b$ $8^{th}$ ignited ends, and from the time t2 the ECU 60 starts to make the exhaust throttle valve 23 operate in the closing direction. Although it has been started to make the exhaust throttle valve 23 operate in the closing direction, with respect to the cylinder $2c$ $9^{th}$ ignited, the state of the determination criterion is still C(9)≥0. Therefore, also at the time t3 when the overlap period of the cylinder $2c$ $9^{th}$ ignited ends, the ECU 60 continues to make the exhaust throttle valve 23 operate in the closing direction. And also, with respect to the cylinder $2a$ $10^{th}$ ignited, the state of the determination criterion is C(10)≥0. Therefore, also at the time t4 when the overlap period of the cylinder $2a$ $10^{th}$ ignited ends, the ECU 60 continues to make the exhaust throttle valve 23 operate in the closing direction.

In this way, the ECU 60 starts to make the exhaust throttle valve 23 operate in the closing direction at the time when the state of C(n) turns to C(n)≥0. Due to this, it is possible to start to ascend the exhaust pressure Pex before the M(n) turns to M(n)≥0. Therefore, the ECU 60 can control to make the exhaust pressure Pin higher than the intake pressure Pex in the overlap period.

The control routine of FIG. 4 above mentioned is executed by the ECU 60, and thereby, the exhaust pressure is controlled to be higher than the intake pressure in the overlap period. Therefore, the blow-by of intake gas does not occur in the overlap period, and accordingly, it is possible to suppress the deterioration of the catalysts.

Figure 6:
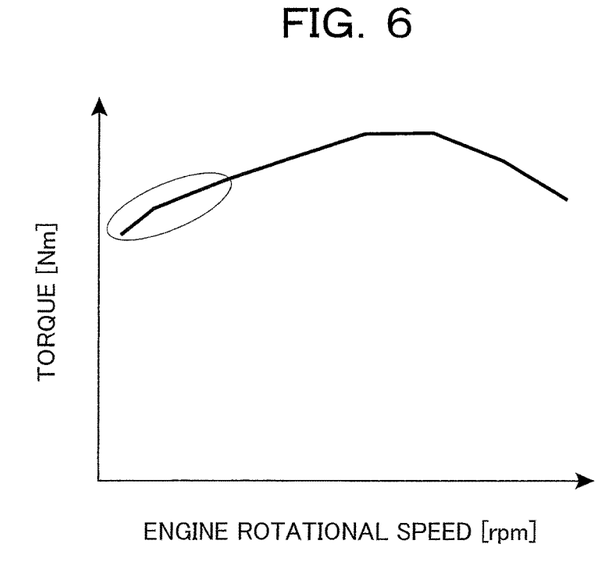
FIG. 6 is a diagram showing generated torque in a case of fully-opened state of a throttle valve of a naturally aspirated inline-three engine.
Figure 7:
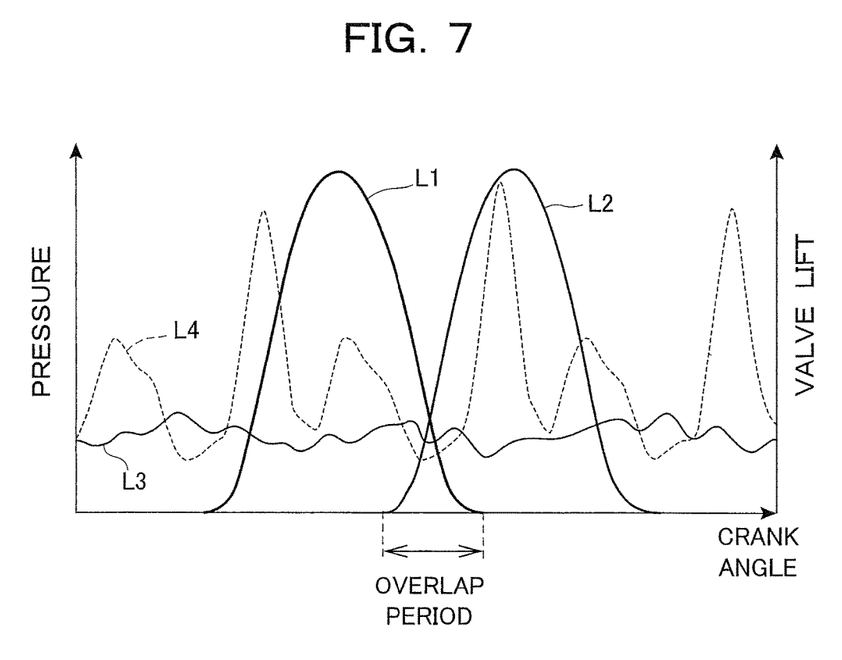
FIG. 7 is a diagram showing change of intake pressure and exhaust pressure in a case where the exhaust throttle valve is used with a fully-opened state continuously.

If the exhaust throttle valve 23 is not controlled by the ECU 60 and is used with a fully-opened state, in a case where such a valve 23 is used on a condition that the engine rotational speed of the internal combustion engine 1 is within a low speed region with a high load, like a region surrounded by a circle in FIG. 6, the passing-by of intake gas occurs in the overlap period. FIG. 7 shows the change of intake pressure and exhaust pressure in a case where the exhaust throttle valve 23 with a fully-opened state is kept to be used on the condition of low speed region with a high load. In FIG. 7, a solid line L1 indicates the valve lift of the exhaust valve 41, and a solid line L2 indicates the valve lift of the intake valve 40. In FIG. 7, a solid line L3 indicates the intake pressure and a dotted line L4 indicates the exhaust pressure. As shown in FIG. 7, there is a period when the exhaust pressure is lower than the intake pressure in the overlap period. Because of this, the passing-by of the intake gas occurs.

Figure 8:
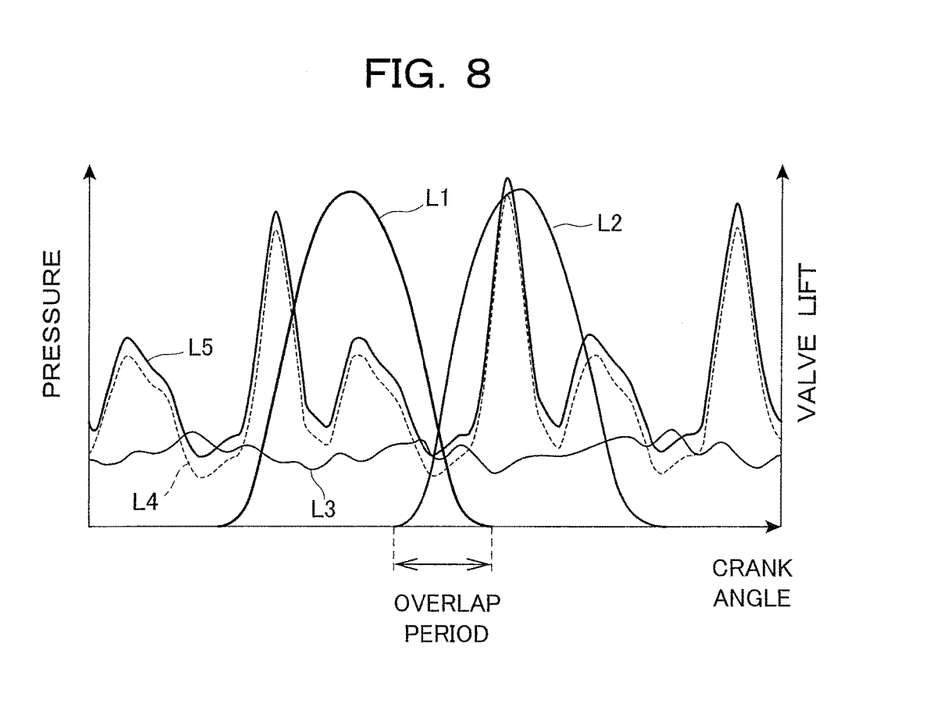
FIG. 8 is a diagram showing change of the intake pressure and change of the exhaust pressure in the second embodiment.

On the other hand, FIG. 8 shows the change of intake pressure and exhaust pressure in a case where the exhaust throttle valve 23 is controlled by the ECU 60 on the condition of a low speed region with a high load same as the condition of FIG. 7. In FIG. 8, a solid line L1 shows the valve lift of the exhaust valve 41, and a solid line L2 shows the valve lift of the intake valve 40. In FIG. 8, a solid line L3 indicates the intake pressure, and a solid line L5 indicates the exhaust pressure. A dotted line L4 indicates the exhaust pressure in a case that the exhaust throttle valve 23 is kept to be used with a fully-opened state. The dotted line L4 is shown for a comparison with the solid line L5. By the control to the exhaust throttle valve 23 of the present embodiment, the exhaust pressure ascends from the dotted line L4 to the solid line L5. Thereby, the exhaust pressure is always higher than the intake pressure in the overlap period, and accordingly, the passing-by of the intake gas does not occur.

Figure 9:
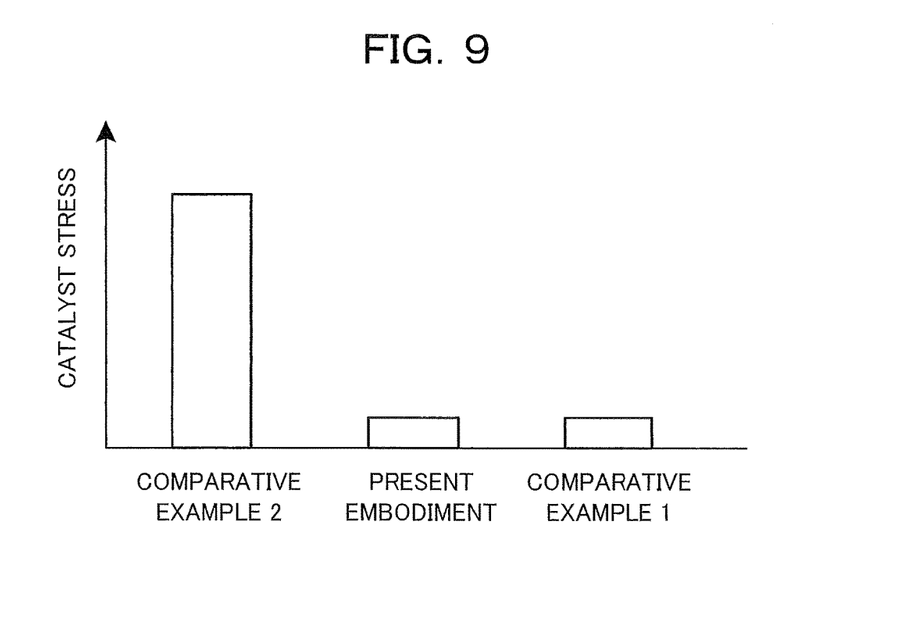
FIG. 9 is a diagram showing a comparison with respect to catalyst stress.
Figure 10:
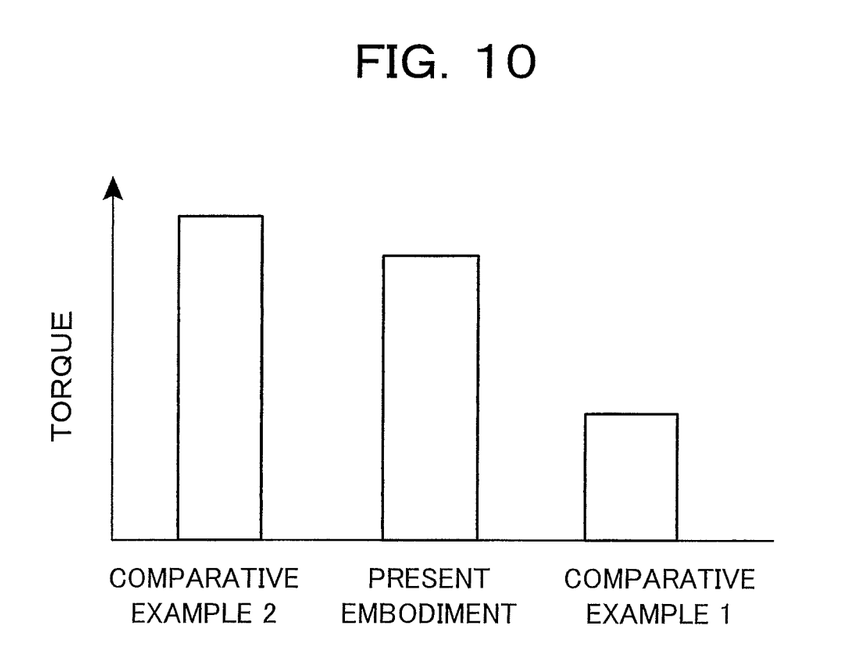
FIG. 10 is a diagram showing a comparison with respect to a generated torque in a case of a fully-opened throttle valve.

A comparative example 1 shown in FIG. 9 and FIG. 10 is a case where the overlap period is eliminated by retard of the intake variable valve mechanism 42 and advance of the exhaust variable valve mechanism 43. A comparative example 2 shown in FIG. 9 and FIG. 10 is a case where the overlap period is kept, and the passing-by of intake gas occurs in the overlap period because the exhaust throttle valve 23 is used continuously with a fully-opened state even in the overlap period. FIG. 9 shows the measurement of catalyst stress. The bigger is the catalyst stress, the faster the deterioration of the catalyst progresses. As shown in FIG. 9, with respect to the performance against the catalyst stress, the present embodiment improves more than the comparative example 2, and almost equal to the comparative example 1. In FIG. 10, compared is generated torque in a state where the throttle valve 10 is fully opened in a low speed region of the engine rotational speed. As shown in FIG. 10, with respect to the generated torque with a fully-opened throttle valve 10, the present invention improves more than the comparative example 1, and shows closely to the comparative example 2. That is, with respect to the performance under a high load of the internal combustion engine 1, the present embodiment improves more than the comparative example 1 and has a performance close to the comparative example 2.

The present invention is not limited to the above embodiments, and can be executed in a various embodiments within a range of the present invention. In each above embodiment, the present invention is applied to an internal combustion engine having three cylinders. However, regardless of the number of cylinders, the present invention may be applied. In each above embodiment, the present invention is applied to a naturally aspirated internal combustion engine which does not have a supercharger. However, the present invention may be also applied to an internal combustion engine which has a supercharger. In each above embodiment, the EGR device is provided. However, regardless of whether the EGR device is provided or not and of which construction the EGR device has, the present invention may be applied. In each above embodiment, the internal combustion engine where fuel is injected into an intake port and air-fuel mixture is ignited in a combustion chamber. However, the present invention may be also applied to an internal combustion engine where fuel is injected directly to a combustion chamber and air-fuel mixture is ignited in the combustion chamber. Further, without detection or estimation of the intake pressure and the exhaust pressure, the present invention may be applied to the following embodiment. The exhaust throttle valve is controlled so that the opening degree of the exhaust throttle valve in the overlap period is made smaller than the opening degree of a case where the overlap period is not provided. According to this embodiment, the opening degree of the exhaust throttle valve of a case where the overlap period is provided is narrower than the opening degree of a case where the overlap period is not provided. Therefore, it is possible to decrease or eliminate the passing-by of intake gas in the overlap period.

The invention claimed is:

1. An internal combustion engine controller for controlling an internal combustion engine,
the internal combustion engine including:
an exhaust throttle valve in an exhaust passage of the internal combustion engine and configured to control flow volume of exhaust gas in the exhaust passage,
at least one of
an intake variable valve mechanism configured to change a timing of opening and closing each intake valve of the internal combustion engine, or
an exhaust variable valve mechanism configured to change a timing of opening and closing each exhaust valve of the internal combustion engine,
an overlap period when an opening period of the intake valve and an opening period of the exhaust valve overlap each other, a plurality of cylinders, and
an exhaust manifold configured to collect the exhaust gas discharged from the plurality of cylinders,
wherein the exhaust throttle valve is provided on a downstream side of the exhaust manifold in the exhaust passage,
the internal combustion engine controller comprising:
a computer programmed to function as a valve controlling device which is configured to control the exhaust throttle valve;
an intake pressure determining device configured to determine an intake pressure in an intake passage of the internal combustion engine; and
an exhaust pressure determining device configured to determine an exhaust pressure in a portion of the exhaust passage on an upstream side of the exhaust throttle valve,
wherein, in response to the exhaust pressure being equal to or less than the intake pressure in the overlap period, the valve controlling device is configured to control the exhaust throttle valve in a closing direction.

2. The internal combustion engine controller according to claim 1, wherein
the valve controlling device is configured to control the exhaust throttle valve to make the exhaust pressure higher than the intake pressure in the overlap period.

* * * * *